United States Patent

Meyer-Adlung et al.

[11] Patent Number: 5,622,575
[45] Date of Patent: Apr. 22, 1997

[54] PNEUMATIC VEHICLE TIRE WITH A SYMMETRICAL CARCASS, SYMMETRICAL BELT PLIES, AND AN ASYMMETRICAL TREAD

[75] Inventors: Jobst Meyer-Adlung; Wolfgang Spitz, both of Hanover; Dieter Rohde, Lehrte; Siegfried Praetorius, Barsinghausen; Klaus-Heiner Hartmann, Neustadt, all of Germany

[73] Assignee: Continental Aktiengesellschaft, Hanover, Germany

[21] Appl. No.: 488,852

[22] Filed: Jun. 9, 1995

[30] Foreign Application Priority Data

Jun. 10, 1994 [DE] Germany .................. 44 20 316.0

[51] Int. Cl.⁶ .................................................. B60C 11/117
[52] U.S. Cl. .................................................. 152/209 A
[58] Field of Search .......................... 152/209 R, 209 D, 152/209 A

[56] References Cited

U.S. PATENT DOCUMENTS

| | | | |
|---|---|---|---|
| 3,217,776 | 11/1965 | Ellenrieder et al. | 152/209 A |
| 3,645,313 | 2/1972 | Roberts et al. | 152/209 R |
| 4,848,429 | 7/1989 | Mezzanotte | 152/209 A |
| 5,458,173 | 10/1995 | Yamashita | 152/209 R |

FOREIGN PATENT DOCUMENTS

| | | | |
|---|---|---|---|
| 2010462 | 8/1990 | Canada | 152/209 R |
| 122530 | 10/1984 | European Pat. Off. | 152/538 |
| 0307340 | 3/1989 | European Pat. Off. | |
| 1480962 | 6/1969 | Germany | 152/209 R |
| 2813597 | 10/1979 | Germany | 152/209 R |
| 9101356 | 2/1991 | Germany | |
| 211902 | 12/1983 | Japan | 152/209 R |
| 208102 | 8/1990 | Japan | 152/209 D |
| 208705 | 9/1991 | Japan | 152/209 R |
| 40213 | 2/1994 | Japan | 152/209 R |
| 357419 | 9/1931 | United Kingdom | 152/209 R |
| 1588575 | 4/1981 | United Kingdom | 152/209 R |

OTHER PUBLICATIONS

Advertisement in magazine "Gummibereifung", Sep. 1988, p. 21.

Primary Examiner—Steven D. Maki
Attorney, Agent, or Firm—Robert W. Becker & Associates

[57] ABSTRACT

A unidirectional pneumatic vehicle tire has a symmetric radial carcass and a symmetric package of belt plies placed on the carcass. The tire tread of an asymmetric tread design has at least three longitudinal grooves having a depth of 12 mm to 18 mm. The tire tread has an axially outer wide tread rib, positioned, when mounted on a vehicle, so as to face outwardly relative to the vehicle. The wide tread rib has a width of 25% to 40% of the width of the tire tread when measured at half the depth of an axially outer one of the longitudinal grooves positioned adjacent to the wide tread rib. The wide tread rib is free of any tread voids having a main direction of extension and is selected from the group consisting of longitudinal grooves, longitudinal sipes, transverse grooves, transverse sipes, diagonal grooves, and diagonal sipes. The wide tread rib has tread voids having in a top view of the tire tread a substantially round contour. The tread voids are arranged in 1 to 4 tracks in a circumferential direction of the tire tread, wherein each one of the tracks comprises 100 to 150 of the tread voids.

7 Claims, 3 Drawing Sheets

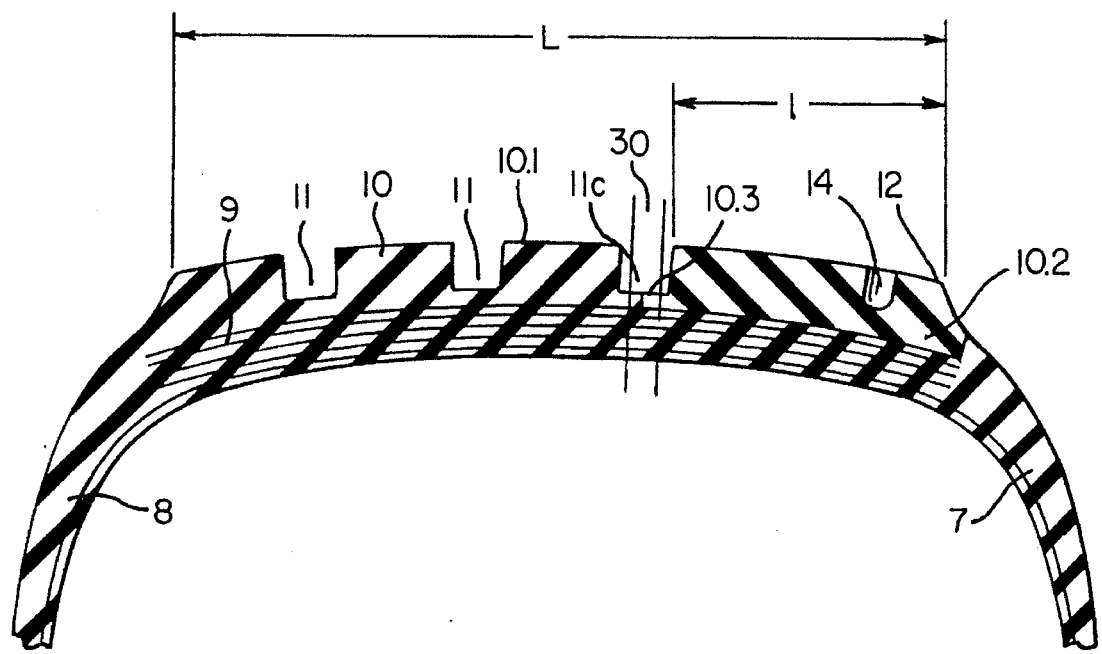
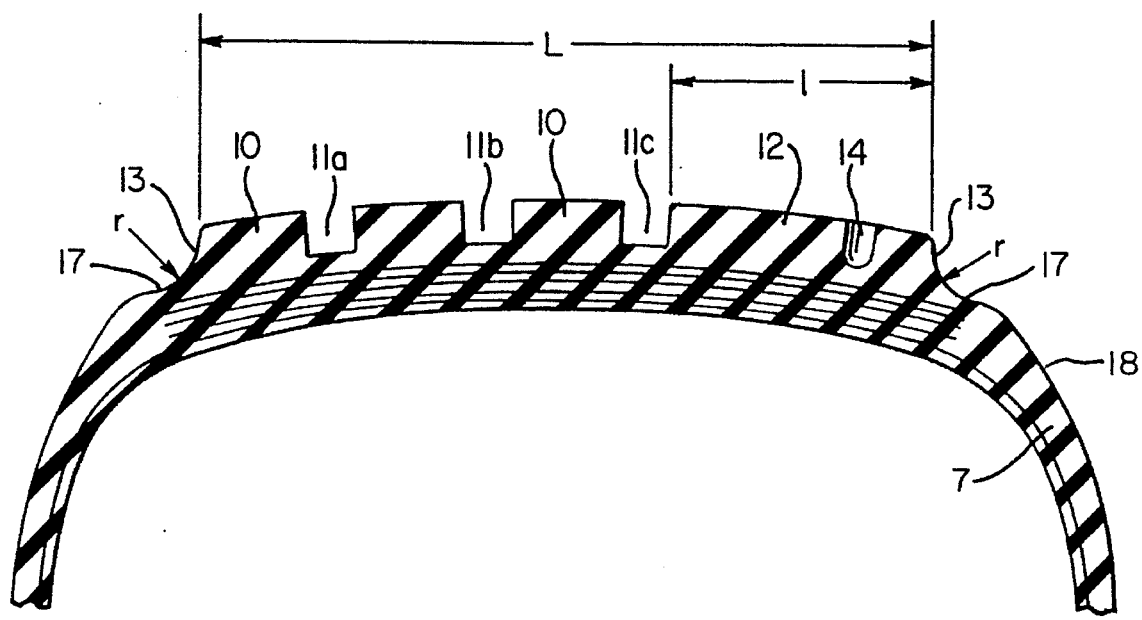

PNEUMATIC VEHICLE TIRE WITH A SYMMETRICAL CARCASS, SYMMETRICAL BELT PLIES, AND AN ASYMMETRICAL TREAD

BACKGROUND OF THE INVENTION

The present invention relates to a pneumatic vehicle tire with a symmetrical package of belt plies on a symmetrical carcass having an essentially radial steel wire and/or aramid fiber extension. An asymmetrical tread with at least three longitudinal grooves of a depth between 12 and 18 mm is provided above it. The tread is, if necessary, radially separated into cap and base. Tires of this kind are particularly designed for the application at the front and/or rear axle of non-steered multi-axle units as they are especially encountered with truck trailers and, above all, often with semitrailers.

Multi-axle units with truck trailers as well as with semitrailers are mostly non-steered, on the one hand, because of the additional initial costs of a steering mechanism of the front and/or rear axle(s), and, on the other hand, because of the additional weight of such a steering kinematic which necessarily reduces the remaining pay load due to the maximum admissible axle load that is determined by the law makers.

This problem is explained with the help of FIG. 1. This Figure illustrates schematically a three-axle semitrailer 1, the coupling point 2 of which is rotated on a circular path 3 about a central point M by a non-illustrated semitrailer truck.

At a quasi-statical view the axle unit, comprising the three non-steered axles 4, 5, and 6, seeks a—narrower—circular path about the point M while one axial that extends through the load central point G of the axle unit extends through the central point M. The position of G depends on the axle load distribution and on the axle bases. If the axle bases between front and center axle and between center and rear axle are the same, and if the axle loads are identical, G is located exactly on the center axle. This case is illustrated here. In this typical case, the two center wheels of the center axle 5 rotate exactly tangentially on a circular path about M.

Due to the missing steering mechanism, the front axle 4 and the rear axle 6, however, cannot follow an exact tangential path. Moreover, a differential angle $\beta_i$ between the tangent $T_i$ to the circular path of the inner wheel and of the circumferential direction of this wheel, i.e., a compulsory slip. The analogous effect applies to the outer wheel of the circlular path where the corresponding magnitude is marked with the index a instead of i.

On viewing the same circular path of the coupling dynamically, centrifugal forces increase by the second power with the speed. The centrifugal forces which have to be balanced out by corresponding centripetal forces. In order for the rear axle arrangement to compensate a resulting lateral force, it requires, according to the slant angle-lateral force diagram, a resulting slant angle that overlays the angle relations examined earlier quasi-statically. Thus, the center axle also assumes a slant angle, even though smaller, in relation to the circular path.

This slant angle required for producing a centripetal force at the center axle, is oriented in the same direction as the earlier discussed quasi-statical slant angle of the rear axle 6. The requirement of balancing the centrifugal forces thus leads to a further increase of the slant angle at the rear axle 6, to the build-up of a certain, correspondingly oriented slant angle at the center axle, and to a reduction of the quasi-statically determined, centrifugally acting slant angle at the front axle 4 (which, under extreme centrifugal forces in relation to the path curvature, finally will lead to a reversal of orientation in the centripetal direction).

This dynamical view shows that with non-steered multi-axle units the highest lateral force load occurs at the rear axle. Accordingly, the wear is highest at this location. In the case of three axle units, in operation, the common service life of tires of identical construction is 80,000 km at the rear axle, 120,000 km at the front axle, and 300,000 km at the center axle.

With passenger car tires it has been known to improve the cornering ability by an asymmetrical tread design that provides an enlarged positive tread portion at the outer side of the tire (the side pointing outwardly relative to the vehicle). Examples of such a design can be found in German Patent No. M 91 01 356.9 and in the advertisement in the magazine "Gummibereifung", 09/88, page 21. However, these known tire designs are not appropriate for utility vehicles and aim at something different, i.e., to increase the maximum possible transverse acceleration.

Moreover, in EP-PS 0 307 340 airplane tires have been suggested—the success of which is not known to the applicant—with which only one of the two tread halves above a symmetrical carcass and belt plies are provided with a pattern. Such tires, however, need only be designed for a service life of approximately 3,000 km and are designed for speeds that are 3 times greater.

It is, therefore, an object of the present invention to increase the service life of pneumatic vehicle tires of the aforementioned kind, especially of tires for semitrailers or trailers with non-steered multi-axle units, in particular of the rear axle.

SUMMARY OF THE INVENTION

The unidirectional pneumatic vehicle tire according to the present invention is primarily characterized by:

a symmetric radial carcass;

a symmetric package of belt plies placed on the carcass;

a tire tread of an asymmetric tread design having at least three longitudinal grooves having a depth of 12 mm to 18 mm;

the tire tread having an axially outer wide tread rib, positioned, when mounted on a vehicle, so as to face outwardly relative to the vehicle, the wide tread rib having a width of 25% to 40% of the width of the tire tread when measured at half the depth of an axially outer one of the longitudinal grooves positioned adjacent to the wide tread rib;

the wide tread rib being free of any tread voids having a main direction of extension and selected from the group consisting of longitudinal grooves, longitudinal sipes, transverse grooves, transverse sipes, diagonal grooves, and diagonal sipes; and the wide tread rib having tread voids having in a top view of the tire tread a substantially round contour, the tread voids arranged in 1 to 4 tracks in a circumferential direction of the tire tread, wherein each one of the tracks comprises 100 to 150 of the tread voids.

Preferably, the width of the wide tread rib is 30% to 38% of the width of the tire tread.

Expediently, both flanks of the wide tread rib extend continuously and free of gaps exactly in the circumferential direction of the vehicle tire.

Advantageously, the width of the widest one of the belt plies is at least 10% greater than the width of the tire tread and a transition of the outer flank of the wide tread rib into the adjacent sidewall of the vehicle tire is in the form of a flute having a radius of less than 60 mm.

The tire tread is preferably comprised of at least two tread strips positioned axially adjacent to one another, wherein the axially outer one of the tread strips is comprised of a different material than the at least one other tread strip. The axially outer tread strip has an abrasion volume of at most 70% of an abrasion volume, measured according to DIN 53516, of the at least one other tread strip.

A border between the axially outer tread strip and an adjacent one of the at least one other tread strip extends substantially radially and is located at a center portion of the axially outer longitudinal groove, wherein the center portion is defined as a zone extending symmetrically about a groove center line of the axially outer longitudinal groove and has a width of 60% of the width of the longitudinal groove at half the depth of the longitudinal groove.

In the alternative, a border between the axially outer tread strip and an adjacent one of the at least one other tread strip extends diagonally in cross-section of the tire tread.

According to the present invention the tire has:
a) a particularly wide rib at the axially outer edge, with the width to be measured between the outer longitudinal groove and the outer flank of the tread being 25% to 40% of the width of the tread, respectively, its contact surface (contact patch),
b) wherein the axially outer tread rib is free of any tread voids which have a main direction of extension (i.e. no longitudinal grooves, no longitudinal sipes, no transverse grooves, no transverse sipes, no diagonal grooves, no diagonal sipes, not even with an undulation),
c) wherein tread voids are present within the axially outer tread rib which are essentially round in plan view, with up to four tracks of tread voids on the axially outer rib and with each track providing between 100 and 150 essentially round tread voids.

By means of the axially outer, particularly wide tread rib, that has so far only been suggested for a couple of high speed passenger tires, it is achieved that a tread depth decrease (tread wear) of this tread area is reduced per driving distance, even when maintaining a constant abrasion volume per driving distance. As a matter of fact, the abrasion volume per driving distance decreases a little as a result of the inventively decreased surface pressure within the outer tread area, a fact that further enhances the inventively achieved decrease of the tread depth per driving distance within the outer tread area.

Preferably, the width of the axially outer rib is 30% to 38% of the width of the tread or contact surface. So far, according to experiments on drum test stands, the most uniform abrasion seems to be achieved at between 35% and 36% at a slant angle simulating practical operating conditions.

The further inventive measure, i.e., the axially outer rib is free of any tread voids which have a main direction of extension, namely is free of longitudinal grooves, lateral grooves, longitudinal sipes, transverse sipes, diagonal grooves and diagonal sipes, increases the positive portion only slightly and particularly serves to prevent the creation, respectively, the growing of cracks. Especially the avoidance of longitudinal sipes results in a decisive reduction of the stress concentration which is due to the transverse outwardly bending of the positives at the tread bottom. With utility vehicles, these stresses are greater by fairly exactly a factor of 10 as compared to high speed passenger vehicle tires because of the air pressure which is higher by approximately the factor 4.4 (at a first approximation, the air presssure corresponds to the surface pressure at the contact surface), further because of the tread depth which is larger by the factor 2.1 (longer lever arm!), and also because of the greater rubber hardness.

The arrangement of tread voids which are essentially round in plan view (in terminology of the art also called "blind holes" because of the missing connection to the longitudinal grooves) within the axially outer, sipe-free rib maintains the required skidding resistance even on wet streets at a lowest possible notch effect and reduces the rubber flow in the circumferential direction when closing the vulcanization mold.

Preferably, the outwardly pointing edge of the outer rib as well as the opposite edge of the wide tread rib are free of divisions (gaps) and they both extend exactly in the circumferential direction. Besides decreasing notch effects, this feature especially serves the minimization of the amplitudes of vibratory impulses at the leading and trailing portion of the contact patch. In spite of the compactness of the outer rib, which causes an increased stiffness of the latter at the circumferential plane and thereby an increase of the fatigue sensitivity at steady-state vibrations, cracks due to vibrations are thus prevented.

The inventive tread design is particularly recommendable for an arrangement of a carcass with belt plies (already published by the applicant) in which the width of at least the widest belt ply is larger by at least 10% than the width of the tread and with which the transition from the axial flanks of the tread into the sidewall is designed as a flute with a flute radius that is smaller than 60 mm. Such tires for which the applicant uses the registered trademark EOT allow a lower rolling resistance by means of a reduction of the tread volume to be flexed and, above all, by a reduction of the concentration of the flexing capacity within the transition area tread/sidewall.

EOT tires are usually operated at the same air pressure as conventional utility vehicle tires (8 bar excess pressure) so that the tread, at the same axle load, is flattened to a contact patch of the same area, wherein the longitudinal dimensions are larger corresponding to the decrease of the transverse dimensions. As a result of this the movement of the leading and trailing portion of the contact patch occurs at greater radial accelerations at a greater distance from the center point of the contact surface, a fact that increases the sensitivity toward tire rotations around the vertical axis. This enhancement of the problem acts—because of the greater distance to the tread center point—particularly significantly within the tread flanks, especially at the flank pointing outwardly. With the inventive features the tread flanks meet the increased requirements of the EOT tire construction.

Inventive tires—with or without an EOT construction—improve their abrasion (wear) behaviour even more if the tread is composed of at least two tread strips which are arranged axially next to each other and are made of different materials, with which the axially most outwardly arranged strip provides—at the most—70% of the abrasion volume compared to the remaining area of the tread.

Various measures for eventually reducing the abrasion volume are known to the expert. One of these measures is increasing the hardness of the rubber. It can be achieved by an increased cross-linking density which is possible by an increased dose of sulfur combined with corresponding adjustments of the dosage of accelerators. This would lead to a lower coefficient of friction on asphalt which may be tolerated within narrow limits, especially if the number of the transverse sipes and/or of the coefficient of friction within the area of the tire tread that is positioned at the inner or the central area of the tire tread, is increased in order to maintain the brake capacity.

Moreover, a small reduction of the coefficient of friction in the axial direction increases the abrasion-reducing action since by this measure the abrasion (wear) is reduced within the particularly abrasion-endangered zones that point outwardly, of course, by accepting a higher abrasion (wear) within the other zones, respectively, on the center axle.

The abrasion (wear) resistance can also be increased by different types of filling material and/or different dosages of filling material. It is known to the expert that an increase in abrasion resistance must not result in a decrease of the coefficient of friction, even if the hardness increases. It is further known to the expert that, when an increased hysteresis is applied, this increase will only show within the high frequency range that is crucial to the coefficient of friction, but not within the lower frequency range that is crucial to the rolling resistance, in order to avoid an increase in the energy consumption as well as an increase in the tread temperature and a related decrease in the retreading capability. It is especially known to the expert that the frequency band of high hysteresis is shifted upwardly when the molecular size of the filling materials and/or polymers decreases.

Furthermore, it is known to the expert that the abrasion resistance can be increased by an increase of the proportion of butadiene (BR) and/or styrene-butadiene (SBR) at the expense of natural rubber. For compensating a greater sensitivity for cracks with an increasing proportion of styrene rubber, it is especially important to design both flanks of the outer wide rib to be free of buckles, i.e., to be softly undulated at the most, preferably be straight.

This preferred development of the invention requires a material border in the tread area within which stresses may concentrate. In order to prevent a failure of the material in these areas, it is suggested to arrange the border between the two different abrasion-resistant strips within the central area of the adjoining longitudinal groove. This central area is defined as the area which is positioned symmetrically around the center line of the groove, at a width of 60% of the groove width, at half the tread depth.

BRIEF DESCRIPTION OF THE DRAWINGS

This object, and other objects and advantages of the present invention will appear more clearly from the following specification in conjunction with the accompanying schematic drawings, in which:

FIG. 2 shows a cross-sectional view of an inventive pneumatic vehicle tire with an axially divided two-component tread strip;

FIG. 3 shows a cross-sectional view of an inventive pneumatic vehicle tire with an axially undivided tread strip;

DESCRIPTION OF PREFERRED EMBODIMENTS

Figure 1:
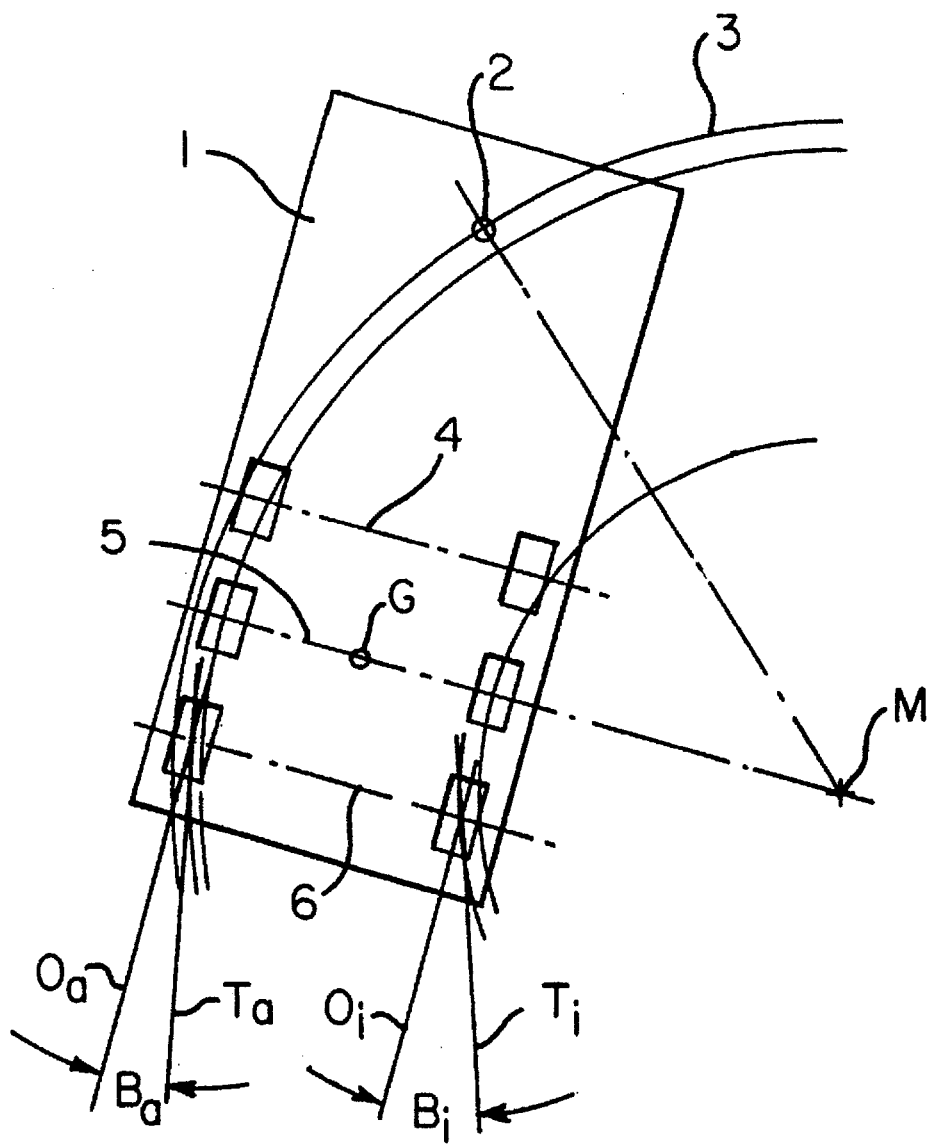
FIG. 1 shows schematically a three-axle semitrailer whose coupling point is moved along a circular path about a central point.

FIG. 2 illustrates a cross-sectional view of an inventive pneumatic vehicle tire 7 with an axially divided two-component tread strip. Above the carcass 8, made out of steel-wire cord, four belt plies 9 are provided which are also made out of steel-wire cord. Above the belt plies a tread strip 10 is positioned.

An essential feature of the invention is the particularly large width 1 of one of the two outer ribs which is marked with the reference numeral 12. In this embodiment the width of this tread rib 12 is 35% of the width L of the entire tread strip 10. This tire 7 is mounted such that the wide tread rib 12 is located so as to face outwardly relative to the vehicle. (In the following "outer" and "inner" will always refer to the sides of the tire as mounted on a vehicle.)

Figure 4:
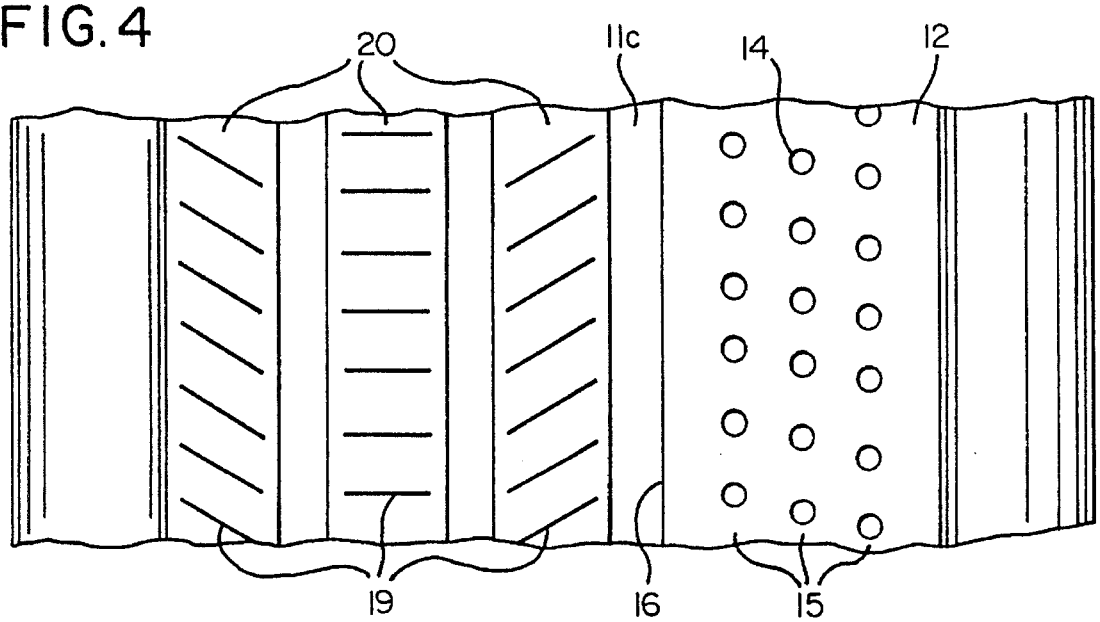
FIG. 4 shows a plan view of a circumferential section of an inventive pneumatic vehicle tire.

Within the wide tread rib only such tread voids 14 are provided which do not have a main direction of extension at the level (which is, of course, slightly bent following the curvature of the tire) that is defined by the circumferential and the axial direction. Thus, the tread voids 14 are essentially round at this level—as FIG. 4 illustrates distinctly. The depth of these tread voids 14 approximately corresponds to the depth of the three longitudinal grooves 11. At the bottom of these tread voids 14 stays for rejecting stones are provided which are not illustrated since a sufficient number of prior art design suggestions are known to the expert.

According to a preferred embodiment of the invention the tread strip 10 is divided into a strip 10.1 that is positioned inwardly relative to the vehicle and a strip 10.2 that is positioned outwardly with respect to the vehicle. The outer strip preferably has at the most 70% of the abrasion volume, to be measured according to DIN 53516, of the strip 10.1 that is positioned inwardly side.

Of course, as is known per se, both tread strips 10.1 and 10.2 can be divided radially; the inner layer is then called "base" and the outer one is called "cap". In such a case, the axial rubber compound differentiation which is discussed here, only applies to the two caps.

Within the outer longitudinal groove 11c, the center portion 30 is illustrated within which the border 10.3 between the two axially positioned tread strips 10.1 and 10.2 is positioned; at this sectional level—with a zigzag shape of the groove 11c, the position of the center portion 30 varies from sectional level to sectional level—the border 10.3 is positioned exactly in the center of the bottom of the groove 11c. In this embodiment, the border 10.3 between the two tread strips 10.1 and 10.2 runs exactly radially.

FIG. 3 illustrates a cross-section of an inventive pneumatic vehicle tire 7 with an axially undivided tread strip 10. Here, in contrast to FIG. 2, a so-called EOT-construction is illustrated, in which the tread strip is constructed to be smaller than the widest belt plies. The inventive tread design of the tread strip 10 exhibits its advantages particularly distinctly with such a tire construction. As illustrated here, an embodiment of the two tread flanks 13 should be chosen with respect to an EOT construction such that a flute 17, the radius r of which is smaller than 60 mm, is created at the respective transition into the sidewall 18, when viewed in cross section.

FIG. 4 illustrates a plan view of a circumferential section of an inventive pneumatic vehicle tire 7. Whereas sipes 19 for securing a high braking power are provided within the three ribs 20 of common width, the outer, according to the invention, particularly wide rib 12 is free of such sipes. Instead, essentially round tread voids 14 are provided (in the shown embodiment they are exactly round) which are arranged in three tracks 15. Both flanks 13 and 16 of the tread rib 12 are free of divisions (gaps) in order to avoid notch effects. The flanks extend circumferentially.

Figure 5:
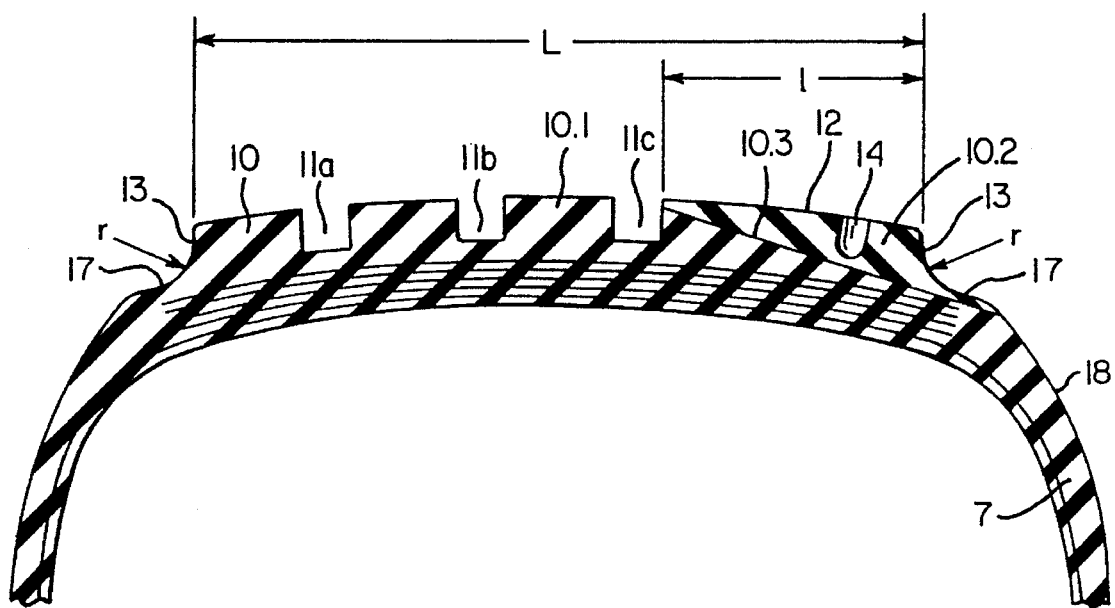
FIG. 5 shows a cross-sectional view of an inventive pneumatic vehicle tire with a diagonally divided tread strip.

FIG. 5 illustrates a cross sectional view of an inventive pneumatic vehicle tire 7 with a diagonally divided two-component tread strip. Above the carcass 8 made out of steel wire cord, four belt plies 9 are provided which are also made of steel wire cord, and above those lies a tread strip 10. The diagonal arrangement provides a material differentiation that corresponds particularly exactly with the load differentiation. The diagonal material border 10.3 penetrates the tread rib 12, which according to the invention is particularly wide, such that the rib 12, when the tire is new, over its entire width comes into contact with the street surface with its especially abrasion-resistant (wear-resistance) mixture. In contrast to the embodiment in FIG. 2 this effect decreases after a certain amount of wear. This is intended with this embodiment since some experimental results suggest that the problem of the edge abrasion diminishes with a decreasing tread depth. Thus, overcompensation can be prevented.

After all, this embodiment, including all associated reference numerals, corresponds to the embodiment in FIG. 2. In particular, the outer tread strip 10.2 is provided with at most 70% of the abrasion volume (to be measured according to DIN 53516) in comparison to the inner tread strip 10.1.

The tires illustrated in these four Figures are designed for semitrailers, especially for the front and rear axles. On these axles they improve particularly significantly the economic efficiency by a reducing the frequency of tire replacements.

The present invention is, of course, in no way restricted to the specific disclosure of the specification and drawings, but also encompasses any modifications within the scope of the appended claims.

What we claim is:

1. A pneumatic vehicle tire for semitrailers, said vehicle tire comprising:

a symmetric radial carcass;

a symmetric package of belt plies placed on said carcass;

a tire tread of an asymmetric tread design having at least three longitudinal grooves having a depth of 13 mm to 18 mm;

said tire tread having an axially outer wide tread rib, positioned, when mounted on a vehicle, so as to face outwardly relative to the vehicle, said wide tread rib having a width of 25% to 40% of the width of said tire tread when measured at half the depth of an axially outer one of said longitudinal grooves positioned adjacent to said wide tread rib;

said wide tread rib being free of any tread voids having a main direction of extension and selected from the group consisting of longitudinal grooves, longitudinal sipes, transverse grooves, transverse sipes, diagonal grooves, and diagonal sipes; and wherein only said wide tread rib of said tire tread has tread voids having in a top view of said tire tread a substantially round contour, said tread voids arranged in 1 to 4 tracks in a circumferential direction of said tire tread, wherein each one of said tracks comprises 100 to 150 of said tread voids.

2. A vehicle tire according to claim 1, wherein said width of said wide tread rib is 30% to 38% of said width of said tire tread.

3. A vehicle tire according to claim 1, wherein both flanks of said wide tread rib extend continuously and free of gaps exactly in the circumferential direction of said vehicle tire.

4. A vehicle tire according to claim 1, wherein:

a width of the widest one of said belt plies is at least 10% greater than said width of said tire tread; and a transition of an outer flank of said wide tread rib into the adjacent sidewall of said vehicle tire is in the form of a flute having a radius of less than 60 mm.

5. A vehicle tire according to claim 1, wherein said tire tread is comprised of at least two tread strips positioned axially adjacent to one another, wherein an axially outer one of said tread strips is comprised of a different material than said at least one other tread strip of said tread strips, and wherein said axially outer tread strip has an abrasion volume of at most 70% of an abrasion volume, measured according to DIN 53516, of said at least one other tread strip.

6. A vehicle tire according to claim 5, wherein a border between said axially outer tread strip and said at least one other tread strip extends substantially radially and is located at a center portion of said axially outer longitudinal groove, wherein said center portion is defined as a zone extending symmetrically about a groove center line of said axially outer longitudinal groove and has a width of 60% of the width of said longitudinal groove at half said depth of said longitudinal groove.

7. A vehicle tire according to claim 5, wherein a border between said axially outer tread strip and said at least one other tread strip extends diagonally in cross-section of said tire tread.

* * * * *